United States Patent [19]

Kim

[11] Patent Number: 5,506,654

[45] Date of Patent: Apr. 9, 1996

[54] LENS FOCUS CONTROL APPARATUS

[75] Inventor: Ki-yong Kim, Kunpo, Rep. of Korea

[73] Assignee: Samsung Electronics Co., Ltd., Kyungki-do, Rep. of Korea

[21] Appl. No.: 191,911

[22] Filed: Feb. 4, 1994

[30] Foreign Application Priority Data

Feb. 4, 1993 [KR] Rep. of Korea .................. 93-1498

[51] Int. Cl.$^6$ .................................................... G03B 13/36
[52] U.S. Cl. ...................................... 354/409; 354/195.13
[58] Field of Search .............................. 354/409, 195.13

[56] References Cited

U.S. PATENT DOCUMENTS

| | | | |
|---|---|---|---|
| 3,486,432 | 12/1969 | Norwood | 354/409 |
| 3,820,129 | 6/1974 | Hosoe et al. | 354/409 |
| 4,264,160 | 4/1981 | Aoki | 354/409 |
| 4,319,238 | 3/1982 | Ogasawara et al. | 354/409 |
| 4,322,141 | 3/1982 | Tominaga et al. | 354/409 |
| 4,364,648 | 12/1982 | Kitai et al. | 354/409 |
| 4,367,934 | 1/1983 | Matsui | 354/409 |
| 4,595,272 | 6/1986 | Wilwerding | 354/409 |

*Primary Examiner*—Russell E. Adams
*Attorney, Agent, or Firm*—Sughrue, Mion, Zinn, Macpeak & Seas

[57] ABSTRACT

A lens focus control apparatus and method for use in a camera optical system and which is manually manipulated by a user, includes a lens position detector for detecting current positions of a focus lens and a zoom lens, a memory for storing a movable region value of the focus lens, a current position value of the focus lens and a contrast ratio value therein, and a display. The display indicates the current position of the focus lens, the range of movement of the focus lens, and the movement direction in the movable region of the focus lens. A microcomputer controls the above elements to adjust an exact focus and to display an exact focus direction using the contrast ratio value.

19 Claims, 4 Drawing Sheets

LENS FOCUS CONTROL APPARATUS

BACKGROUND OF THE INVENTION

The present invention relates to a lens focus control apparatus, and more particularly to apparatus for displaying the desired direction of movement of a focus lens and for adjusting the current position of the focus lens to bring into exact focus a video camera or a camera recorder (camcorder). The present invention uses an inner focus lens method in which the focus length is manually adjusted.

In general, there are two basic focus lens drive methods. In a front focus lens method, a focus lens is positioned in front of a camera for easy manipulation of the focus lens by hand. In an inner focus lens method, the focus lens is positioned in the middle of the camera and the focus length of the focus lens is adjusted by driving a focus lens drive motor.

The inner focus lens method is limited by the drive characteristic of the focus lens. Accordingly, when the camera is greatly out of focus, the user cannot judge the correct direction of movement of the focus lens to bring the camera into exact focus until considerable time, e.g., about one or two seconds, has passed. Also, since the user manipulates the focus lens to move it to the in-focus position, he or she cannot easily judge whether or not the direction of movement is correct. One prior art method and apparatus for discriminating and displaying a focus state during the manual focus adjustment is disclosed in U.S. Pat. No. 4,572,643.

SUMMARY OF THE INVENTION

To solve the above problems, it is an object of the present invention to provide a lens focus control apparatus and method for displaying a target direction of movement for a focus lens using a contrast ratio value corresponding to a position value of the focus lens, so as to reduce the time it takes for a user to properly focus the camera.

It is another object of the present invention to provide a lens focus control apparatus and method for displaying a target direction of movement of a focus lens and for adjusting the position of the focus lens based on the position of a zoom lens, so as to reduce the time it takes for a user to properly focus the camera.

To accomplish the above first object of the present invention, there is provided a lens focus control apparatus and method for manually adjusting and displaying a focussing state of a focus lens with respect to an object to be photographed, the lens focus control apparatus and method comprising:

contrast ratio detection means for detecting a contrast ratio value with respect to the object to be photographed in correspondence to a position value of the focus lens; means for storing a respective contrast ratio value which is obtained by moving the focus lens; on-screen-display means for generating a control signal representing a target direction in which the focus lens is to be moved for exact focussing; and control means for determining the target direction by comparing the stored contrast ratio values with one another in size, and controlling the on-screen-display means so that the target direction is displayed.

To accomplish the above second object of the present invention, there is provided a lens focus control apparatus and method for adjusting and displaying a focussing state of a focus lens of which the movable region is determined by a position of a zoom lens with respect to an object to be photographed, the lens focus control apparatus and method comprising:

lens position detection means for detecting position values of the zoom lens and the focus lens; command input means which is manually manipulated by a user for moving the focus lens; drive means for moving the focus lens according to a drive control signal; contrast ratio detection means for detecting a contrast ratio value with respect to the object to be photographed; means for storing a movable region value in correspondence to the position of the zoom lens therein, and storing a respectively different contrast ratio value which is obtained in correspondence to the position of the focus lens therein; on-screen-display means for generating a control signal representing a target direction where the focus lens is to be moved for exact focussing; and control means for supplying the drive control signal to the drive means, determining the target direction by comparing the stored contrast ratio values which are obtained by the position movement of the focus lens with one another in size, and controlling the on-screen-display means so that the target direction is displayed.

DETAILED DESCRIPTION OF THE PREFERRED EMBODIMENT

A preferred embodiment of the present invention will be described below in more detail with reference to the accompanying drawings.

Figure 1:
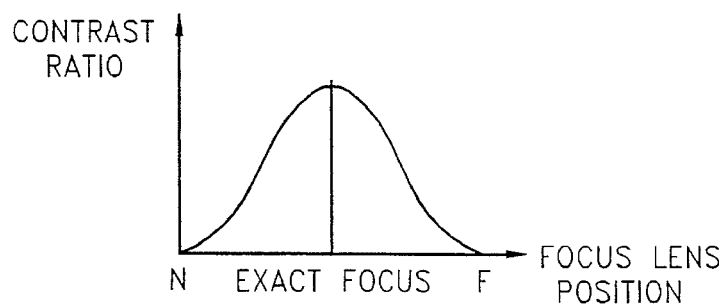
FIG. 1 is a graph showing the relationship between a contrast ratio and a focus lens position.

FIG. 1 shows the relationship between the contrast ratio and the focus lens position in a camera. The focus position is shown on the horizontal axis and the contrast ratio is shown on the vertical axis. Generally, the closer the lens position is to the exact focus position, the larger the resulting contrast ratio. Thus, when the contrast ratio is increasing, the focus lens is moving closer to the position of exact focus, whereas when the former decreases, the latter is moving farther from the position of exact focus.

Figure 2:
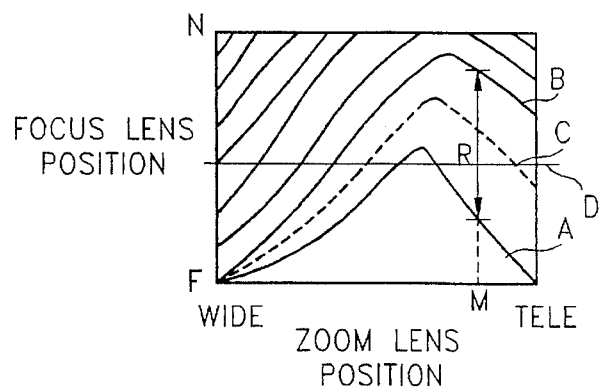
FIG. 2 is a graph showing the movable region of a focus lens which is constrained by the position of a zoom lens.

FIG. 2 shows the movable region of a focus lens which is constrained by the position of a zoom lens. In FIG. 2, the movable position of the zoom lens is plotted along the horizontal axis and the movable position of the focus lens is plotted along the vertical axis. In FIG. 2, the lowest curve "A," represented by a solid line, represents a position of the focus lens which is determined by a position of the zoom lens when an object to be photographed is located in an infinite distance. The solid line "B" represents a position of the focus lens which is determined by a position of the zoom lens when the object to be photographed is located at a distance of 0.8 m from the focus lens. Thus, when the current position of the zoom lens is a point "M" of FIG. 2, the movable position of the focus lens is represented by a region "R." A curve "C" represented by a dotted line represents a center position of the focus lens in the movable region of the focus lens. A line "D" parallel to the horizontal axis represents a mechanical center of the focus lens.

Figure 3:
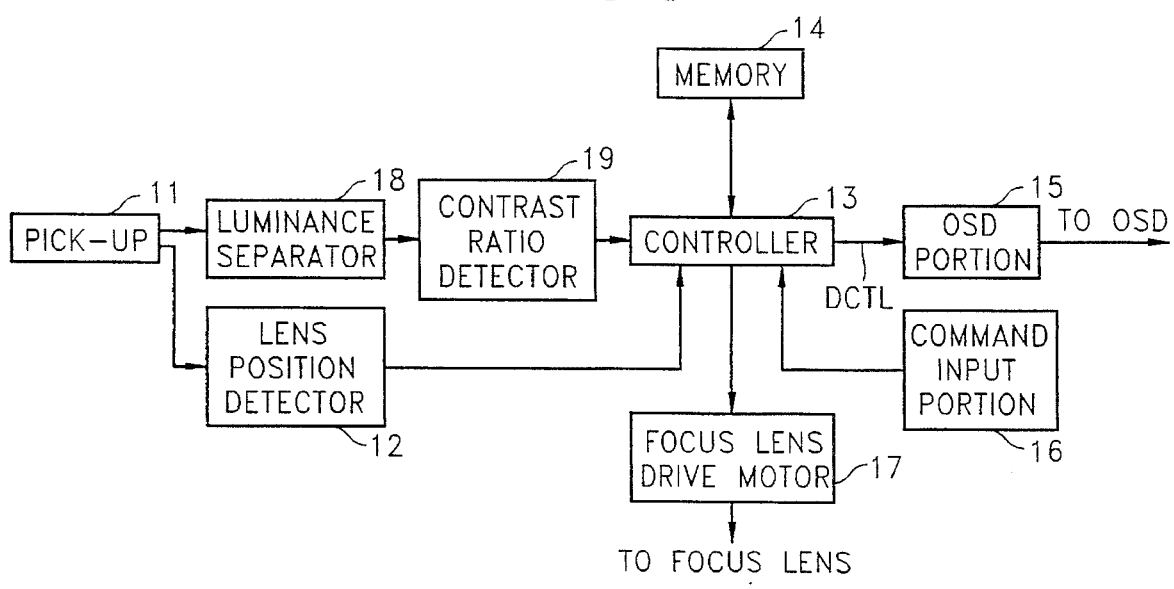
FIG. 3 is a block diagram of a lens focus control apparatus according to a preferred embodiment of the present invention.

FIG. 3 is a block diagram of a lens focus control apparatus according to a preferred embodiment of the present invention and shows an apparatus for accomplishing exact focussing in a camera system adopting an inner focus lens method. In FIG. 3, an optical system 11 comprises a zoom lens, a focus lens and opto-electric transducer elements which are not shown in the drawing. A lens position detector 12 is connected to an output of optical system 11 to detect current position values of the zoom lens and the focus lens. Lens position detector 12 is connected to a controller 13 which receives the detected position values. A luminance separator 18 detects a luminance signal frown the output signal of optical system 11 to supply the detected luminance signal to a contrast ratio detector 19. Contrast ratio detector 19 receives the input luminance signal and generates a contrast ratio value with respect to the object to be photographed, so as to supply the detected contrast ratio value to controller 13. A memory 14 stores the movable region value of the focus lens which is determined by the position of the zoom lens therein. Also, memory 14 stores the contrast ratio value and the position value with respect to the object to be photographed. Memory 14 is connected to controller 13. A command input portion 16 and a focus lens drive motor 17 are also connected to controller 13. Command input portion 16 supplies the user's input commands, such as a focus lens movement instruction, to controller 13. Controller 13 receives the output signals from lens position detector 12, memory 14 and contrast ratio detector 19, to generate an information display control signal and a motor drive control signal for exact focussing under the control of a stored algorithm. An on-screen-display portion 15 is connected to controller 13, so as to generate an on-screen-display signal for dividing the movable region value of the focus lens by n and displaying the divided-by-n value on an on-screen-display (not shown). Also, on-screen-display portion 15 generates the on-screen-display signal for representing the movable direction of the focus lens.

Figure 4A:
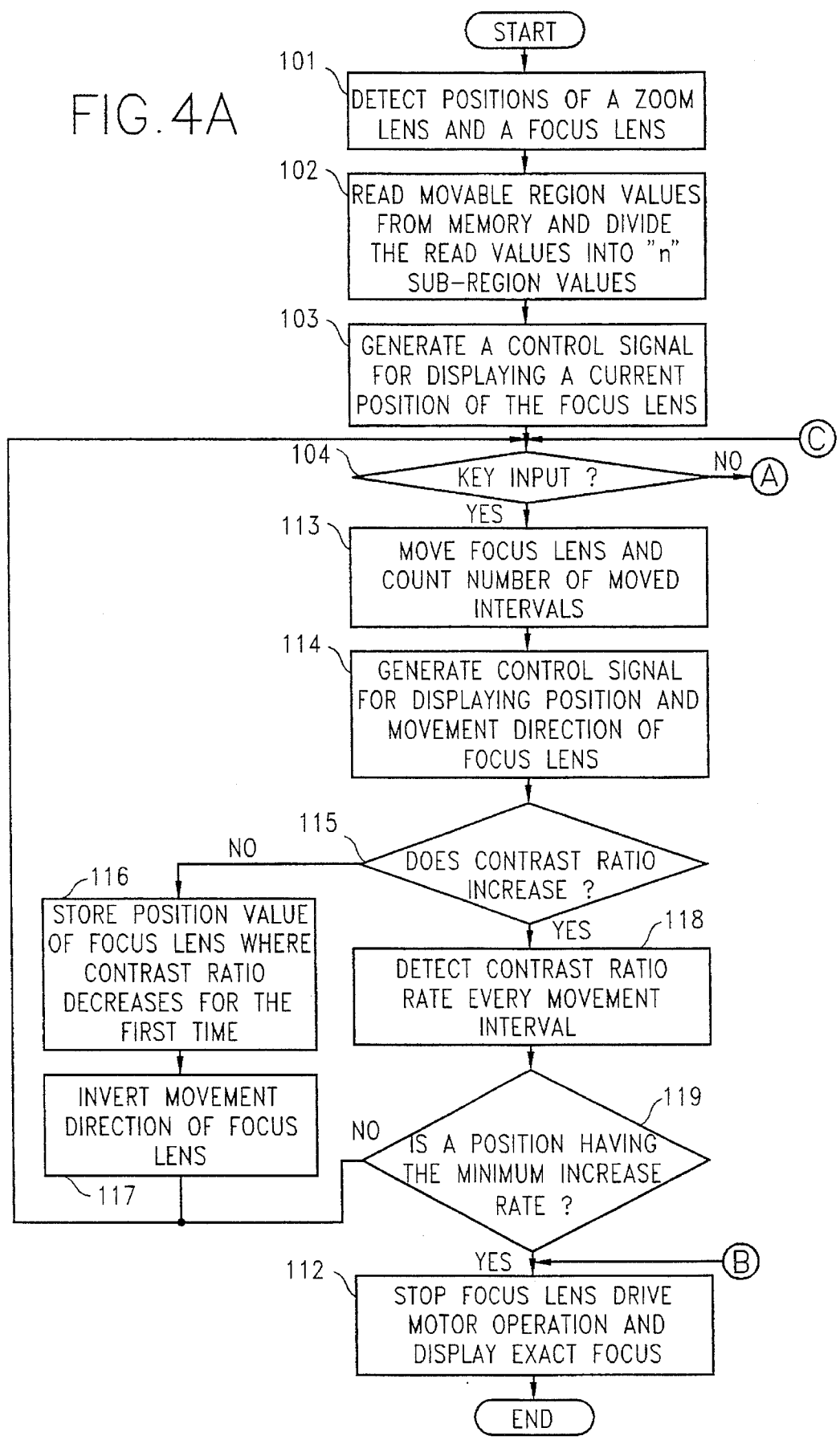
FIG. 4A and FIG. 4B, taken together, constitute a flowchart diagram for explaining the operation of the controller shown in FIG. 3.
Figure 4B:
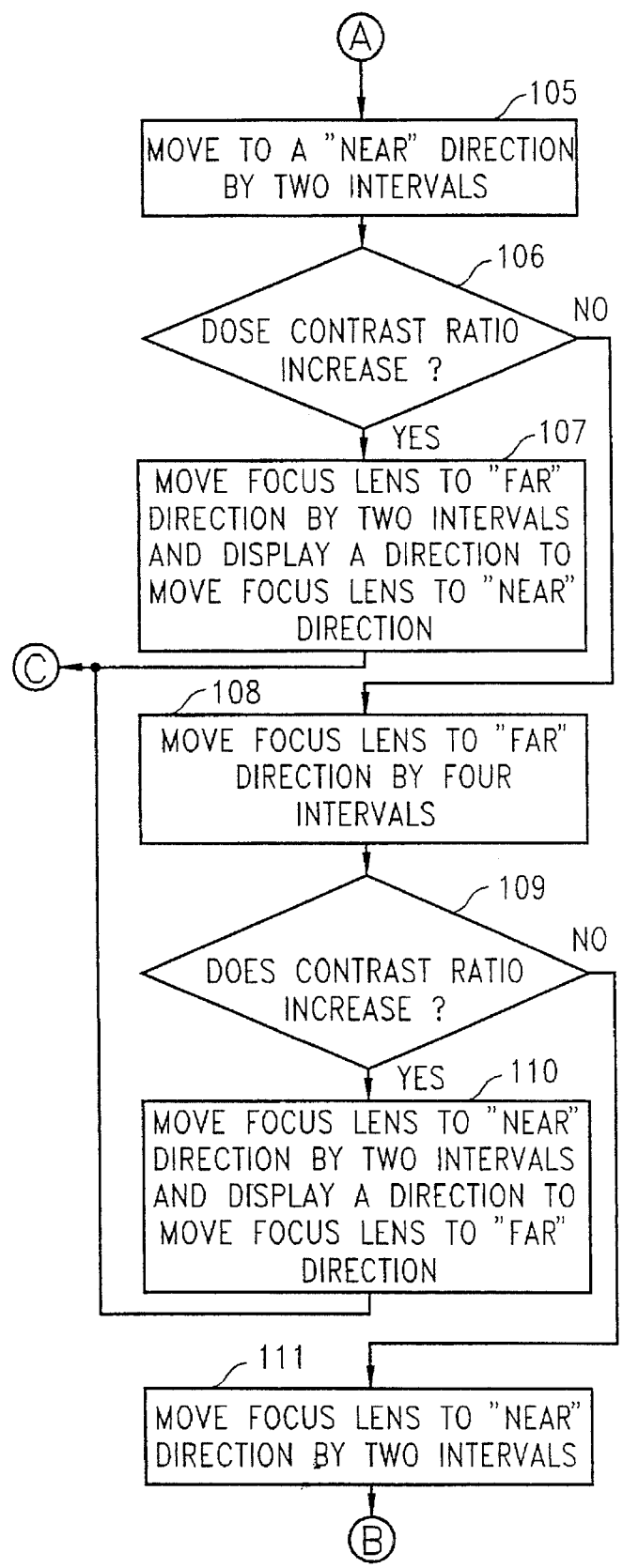

FIGS. 4A and 4B, taken together, explain the operation of the system of FIG. 3 to display the target direction necessary to achieve focus, to display the incremental relative focus position of the focus lens, and to accomplish focussing.

Figure 5A:
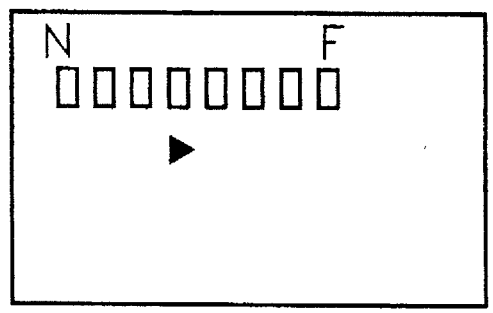
FIGS. 5A and 5B show information for adjusting a focus which is displayed under the control of the on-screen-display means of FIG. 3.
Figure 5B:
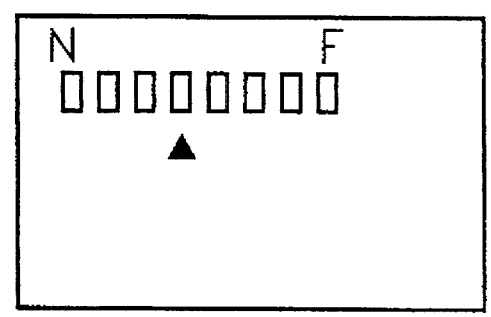

Basically, the focus lens movable region "R," as explained above, depends upon the position of the zoom lens. Values for "R" are stored for each zoom lens position. The value "R" for the current zoom lens position is read out of memory and displayed on a view finder as n increments, as shown in FIGS. 5A and 5B, from the rear focus position "N" to the infinity focus position "F." Also displayed is an arrowhead which is positioned nearest the increment corresponding to current focus lens position and which has three directions: towards "F," towards "N," and towards the increment. When directed towards "F," as in FIG. 5A, that indicates that the target focus direction is towards "F." The opposite is the case when directed towards "N." When the arrow is directed towards the increment, as in FIG. 5B, that means the lens is in focus.

The system starts with the lens in the center of the moveable region R. The system then moves the lens a couple of increments in both directions to determine, by comparing contrast ratios, which direction is the target direction for achieving focus. The system displays the target direction as described with reference to FIGS. 5A and 5B.

Next, when the operator causes the focus lens to move by pressing an appropriate key on the command input portion, the lens is moved accordingly. The controller follows the movement by detecting changes in the contrast ratio and noting increases and decreases and adjusts the position and direction of the arrowhead on the display accordingly.

It will be noted that, although the lens is driven by a motor, since the lens motor is actuated by the operator actuating a key to control the direction and the amount of movement, the lens movement is generally referred to as manual control of focussing.

Details of the operation, with reference to FIGS. 3–5B, will now be described.

Controller 13 receives current positions of the zoom lens and the focus lens when lens position detector 12 supplies the information on the current positions of the zoom lens and the focus lens to controller 13 (step 101). The current position of the focus lens is set to a mechanical center represented by a symbol "D" of FIG. 2. This position is the initial position for exact focussing. Controller 13 instructs memory 14 to store the contrast ratio value corresponding to the current position of the focus lens. This contrast ratio value with respect to the object to be photographed is input from contrast ratio detector 19 to controller 13. Controller 13 reads out from memory 14 the movable region value "R" of the focus lens for the particular current position of the zoom lens and divides the value "R" by an integer n corresponding to the number of increments of the display of FIGS. 5A and 5B (step 102). Then, a control signal DCTL for representing the divided-by-n movable region value of the focus lens and the current position value of the focus lens is supplied to an on-screen-display portion 15 to create a display, such as in FIG. 5A or FIG. 5B (step 103). On-screen-display 15 receives display control signal DCTL and generates an on-screen-display signal for representing the movable region value in n increments and for representing the current position of the focus lens. The on-screen display signal is displayed through a view finder which is not shown in the drawing.

FIGS. 5A and 5B show examples of the information displayed under the control of the on-screen-display means 15 of FIG. 3. FIG. 5A is a display representing a target movement direction, as well as current position of the focus lens, and FIG. 5B is a display representing an exact focussing state, as well as current position, of the focus lens. In FIGS. 5A and 5B, symbols "N" and "F" represent abbreviation of words "near" and "far" and represent limit positions in the movable region of the focus lens, that is, the movement limit positions of the focus lens in terms of software.

Returning to FIG. 4, controller 13 judges whether or not the user's key input for the movement of the focus lens is supplied from command input portion 16 (step 104). When the user's key input does not exist in step 104, the system operates to find and display the target direction. Controller 13 controls focus lens drive motor 17 to cause the focus lens to move two intervals toward "N" (step 105). Controller 13 compares the resulting new contrast ratio value input through contrast ratio detector 19 after the focus lens has been moved with the contrast ratio value previously stored in memory 14 (step 106). If the contrast ratio value has increased, indicating that the direction towards "N" is the target direction, controller 13 controls focus lens drive motor 17 to cause the focus lens to move two intervals toward "F" (i.e., back to initial position) and to simultaneously control the on-screen-display portion 15 so as to indicate the target direction by causing the arrowhead to point in the "N" direction (step 107). If the contrast ratio value does not increase in step 106, the focus lens is moved four intervals toward "F" and the display control signal DCTL corresponding thereto is generated (step 108). Then, controller 13 compares the contrast ratio value read from memory 14 with the new contrast ratio value obtained through contrast ratio detector 19 obtained following the last movement of the lens (step 109). If the contrast ratio value increases, indicating that the direction towards "F" is the target direction, controller 13 controls focus lens drive motor 17 to cause the focus lens to move two intervals toward "N" (i.e., back to the initial position) and to simultaneously control the on-screen-display portion 15 so as to indicate the target direction by causing the arrowhead to point in the "F" direction (step 110). On the other hand, if the contrast ratio value does not increase in step 109, indicating that the initial position is the exact focus position, controller 13 controls focus lens drive motor 17 to cause the focus lens to move two intervals towards "N" (i.e., back to the initial position) and points the arrowhead to the increment to indicate "in-focus" (step 111). By performing steps 107 and 110, the focus lens is always returned to the center position in the movable region thereof. Also, by performing steps 107 and 110, the user will know the target direction to move the focus lens. If step 111 is performed, the center position in the movable region of the focus lens is the exact focus position thereof. Thus, controller 13 controls focus lens drive motor 17 to stop and generates display control signal DCTL for representing an exact focus to on-screen-display portion 15 (step 112). In the above description of the preferred embodiment, the search for the target direction begins with the movement of the focus lens two intervals in the "N" direction. However, the particular direction or number of intervals is not so limited in the present invention, so that it is possible to attain various modifications and variations. In the initial stage of the manual focus adjustment, since it will take the user a little time to depress the key input, controller 13 will ordinarily perform steps 105–111 before any key input is detected.

If the key input exists through command input portion 16 in step 104, controller 13 counts the movement direction and the number of the movement intervals corresponding to the output signal of command input portion 16 (step 113). Then, focus lens drive motor 17 is controlled by a control signal corresponding to the movement direction and the number of the movement intervals. Also, controller 13 supplies display control signal DCTL for representing the position and movement direction of the focus lens to on-screen-display portion 15 (step 114). Controller 13 compares a new contrast ratio value resulting from the movement of the focus lens with the contrast ratio value stored in memory 14 (step 115). If the contrast ratio value decreases, controller 13 stores in memory 14 the position value of the focus lens where the contrast ratio value starts to decrease (step 116), and controls the on-screen-display portion 15 so as to indicate inversion of the movement direction of the focus lens (step 117). Then, controller 13 repeats the procedures after step 104. If the contrast ratio value increases in step 115, the rate of increase of the contrast ratio value is calculated using the contrast ratio value obtained by the movement of the focus lens and the contrast ratio value stored in memory 14 (step 118). Also, in step 118, the calculated contrast ratio value increase rate is stored in memory 14. Controller 13 detects the position of the focus lens at which the contrast ratio value increase rate becomes minimum (step 119). The steps 104 through 119 repeat until the minimum contrast ratio value increase rate is detected. If the focus lens position having the minimum contrast ratio value increase rate is detected in step 119, controller 13 supplies a control signal to focus lens drive motor 17 to stop the movement of the focus lens, and controls on-screen-display portion 15 so that a signal for displaying an exact focus is generated by on-screen-display portion 15 (step 112).

In the above embodiment, although the present invention has been described using the inner focus lens method, it is obvious to a person skilled in the art that the present invention can be embodied using a front focus lens method.

As described above, the lens focus control apparatus according to the present invention notifies the user of the direction of the exact focus, so as to reduce the time it takes to bring the focus lens into exact focus for the object to be photographed.

I claim:

1. A lens focus control apparatus for a camera having a focus lens which is moveable relative to a fixed plane in order to bring the focus lens to an exact focus position relative to a focal plane and an object to be photographed, comprising:

a display for displaying information indicating a range of movement of said focus lens, a current position of said lens within said range, and indications of target direction of movement of said lens to achieve exact focus;

means for detecting the current contrast ratio of light resulting from light passing through said lens at its current position to said focal plane;

means responsive to the position of said focus lens within its range of movement for controlling said display to cause said display to indicate the current position of said focus lens;

means responsive to the contrast ratios detected at several different focus lens positions for comparing said contrast ratios with one another to obtain a target direction of movement of said lens; and means responsive to said comparing means for causing said display to indicate the target direction of said focus lens.

2. A lens focus control apparatus as claimed in claim 1, further comprising means responsive to said comparing means for causing said display to indicate exact focus condition when said lens is in the exact focus position.

3. A lens focus control apparatus as claimed in claim 1, further comprising: drive means for moving the position of said focus lens relative to said focal plane; and manually actuable key means for controlling the direction and amount of movement of said lens through said drive means.

4. A lens focus control apparatus as claimed in claim 3, further comprising means, operable in the absence of actuation of said key means, for applying control signals to said drive means to move said lens in a manner to determine said target direction.

5. A lens focus control apparatus as claimed in claim 3, further comprising controller means operable in conjunction with said display means for causing said lens to move and said display means to display in the following sequence when there is an absence of actuation of said key means:

(a) the lens moves from an initial position a fixed incremental amount in a first direction to reach a second position;

(b) if the contrast ratio value at said second position is greater than the contrast ratio at said initial position, the lens moves back to said initial position, and said display indicates the current position of the lens and indicates that said first direction is said target direction, and lens movement stops until manual actuation of said key;

(c) if the contrast ratio value at said second position is not greater than the contrast ratio position at said initial position, the lens is moved in a second direction to a third position an incremental amount on the other side of said initial position;

(d) if the contrast ratio value at said third position is greater than the contrast ratio value at said initial position, the lens is moved back to said initial position, and said display indicates the current position of the lens and indicates that said second direction is said target direction, and lens movement stops until manual actuation of said key; and (e) if the contrast ratio value at said third position is not greater than the contrast ratio value at said initial position, the lens is moved back to the initial position and said display indicates the current position of the lens and indicates that the current position is the exact focus position.

6. A lens focus control apparatus as claimed in claim 5, wherein said controller means further operates in response to actuation of said key to cause movement of said lens and display of information on said display means as follows:

(a) said controller issues control signals to said lens drive means to drive said lens in a direction and an amount corresponding to said key input, and issues signals to said display means to indicate the position of said lens, and the movement direction is indicated on the display as the target direction;

(b) if the contrast ratio value decreases at any time during movement, the controller detects the lens position at the point where said decrease first occurs, and the display indication of target direction is inverted;

(c) if the contrast ratio value increases during movement, said controller detects the rate of increase of said value for every increment of movement and checks for a minimum rate of increase and stops the drive of the focus lens when said minimum rate of increase is detected, and displays the stopped position of said lens as the exact focus position.

7. A lens focus control apparatus as claimed in any of claims 1 through 6, wherein said camera further includes a zoom lens, and wherein said lens focus control apparatus further comprises:

storage means for storing range of movement values of said focus lens, each said range of movement value corresponding to a different position of said zoom lens; and means responsive to the position of said zoom lens for selecting from said storage means the corresponding focus lens range of movement value and for causing said display means to display said selected value as the range of movement of said focus lens.

8. A lens focus control apparatus as claimed in claim 7, wherein said selected value is displayed as a scale of increments of movement from a near focus position to a far focus position, with said focus lens position being indicated by a pointer positioned between said near and far focus positions and adjacent to an increment corresponding to the actual incremental position of said focus lens between the actual near and far focus positions of said focus lens, and where the target direction is indicated on the display by the pointing direction of said pointer.

9. The lens focus control apparatus as claimed in claim 8, wherein said storage means further stores the contrast ratio value detected at said initial position of said focus lens.

10. The lens focus control apparatus as claimed in claim 9, further including lens position detecting means for detecting the position of said focus lens and the position of said zoom lens.

11. In a camera having a focus lens which is moveable relative to a fixed plane in order to bring the focus lens to an exact focus position relative to a focal plane and an object to be photographed, the method comprising:

displaying on a display means information indicating a range of movement of said focus lens, a current position of said lens within said range, and the target direction of movement of said lens to achieve direct focus;

detecting the current contrast ratio of light resulting from light passing through said lens at its current position to said focal plane;

controlling said display to cause said display to indicate the current position of said focus lens;

comparing the current contrast ratios detected at several different focus lens positions to obtain a target direction of movement of said lens; and causing said display to indicate the target direction of said focus lens.

12. The method as claimed in claim 11, further comprising the step of causing said display to indicate exact focus condition when said lens is in the exact focus position.

13. The method as claimed in claim 11, further comprising the steps of:

adjustably controlling the position of said focus lens relative to said focal plane to obtain current contrast ratios at several different focus lens positions.

14. The method as claimed in claim 13, further comprising the steps of:

(a) moving the focus lens from an initial position a fixed incremental amount in a first direction to reach a second position;

(b) if the contrast ratio value at said second position is greater than the contrast ratio at said initial position, moving the lens back to said initial position, and indicating on said display the current position of the lens and indicating on said display that said first direction is said target direction, and stopping movement of said lens:

(c) if the contrast ratio value at said second position is not greater than the contrast ratio position at said initial position, moving the lens in a second direction to a third position an incremental amount on the other side of said initial position;

(d) if the contrast ratio value at said third position is greater than the contrast ratio value at said initial position, moving the lens back to said initial position, and displaying on said display means the current position of the lens and indicating thereon that said second direction is said target direction, and stopping further movement of said focus lens; and (e) if the contrast ratio value at said third position is not greater than the contrast ratio value at said initial position, moving the lens back to the initial position and displaying on said display the current position of the lens and indicating thereon that the current position is the exact focus position.

15. The method as claimed in claim 14, wherein the camera includes a key actuable manually to drive the focus lens in a direction and amount under control of the operator, and wherein said method further comprises the steps, in response to actuation of said key:

(a) moving said lens in a direction and an amount corresponding to said key input, and displaying on said display means the position of said lens, and displaying on said display means the movement direction as the target direction;

(b) if the contrast ratio value decreases at any time during movement, detecting the lens position at the point where said decrease first occurs, and reversing the display indication of target direction on said display;

(c) if the contrast ratio value increases during movement, detecting the rate of increase of said value for every increment of movement and checking for a minimum rate of increase and stopping the drive of the focus lens when said minimum rate of increase is detected, and displaying on said display the stopped position of said lens as the exact focus position.

16. The method as claimed in any of claims 11 through 15, wherein said camera further includes a zoom lens, and wherein said method further comprises:

storing range of movement values of said focus lens, each said range of movement value corresponding to a different position of said zoom lens; and selecting from said storage means the focus lens range of movement value stored for the corresponding current position of said zoom lens, and displaying on said display means said selected value as the range of movement of said focus lens.

17. The method as claimed in claim 16, further comprising:

displaying said selected value as a scale of increments of movement from a near focus position to a far focus position;

displaying said focus lens position by a pointer positioned between said near and far focus positions and adjacent to an increment corresponding to the actual incremental position of said focus lens between the actual near and far locus positions of said focus lens;

and displaying the target direction the display by the pointing direction of said pointer.

18. The method as claimed in claim 17, further comprising storing the contrast ratio value detected at said initial position of said focus lens.

19. The method as claimed in claim 18, further comprising detecting the position of said focus lens and the position of said zoom lens.

* * * * *